United States Patent
Walance (10) Patent No.: US 6,215,854 B1
(45) Date of Patent: Apr. 10, 2001

(54) DIGITAL SIGNAL PROCESSOR-BASED TELEPHONE TEST SET ANALYZING AND DISPLAYED MULTIPLE SIGNAL PARAMETER DATA FOR TERMINAL MODE AND LINE MONITOR MODE OPERATION

(75) Inventor: Robert B. Walance, Newbury Park, CA (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/206,570

(22) Filed: Dec. 7, 1998

Related U.S. Application Data (63) Continuation-in-part of application No. 08/885,372, filed on Jun. 30, 1997.

(51) Int. Cl.[7] .................................................. H04M 1/24
(52) U.S. Cl. .................................. 379/21; 379/3; 379/5; 379/6
(58) Field of Search .................................. 379/21, 3, 5, 6

(56) References Cited

U.S. PATENT DOCUMENTS

| | | | |
|---|---|---|---|
| 4,837,811 | * | 6/1989 | Butler et al. ........................... 379/96 |
| 5,404,388 | * | 4/1995 | Euq ....................................... 379/24 |
| 5,473,666 | * | 12/1995 | Szczebak, Jr. et al. ................. 379/3 |
| 5,619,489 | * | 4/1997 | Chang et al. ......................... 370/241 |
| 5,657,384 | * | 8/1997 | Staudacher et al. ................. 379/388 |
| 5,661,795 | * | 8/1997 | Maeda ................................. 379/412 |
| 5,838,786 | * | 11/1998 | Brown et al. ........................ 379/407 |
| 5,881,129 | * | 3/1999 | Chen et al. .............................. 379/5 |
| 5,903,624 | * | 5/1999 | Boswell et al. ........................ 379/21 |
| 5,903,625 | * | 5/1999 | May ....................................... 379/21 |
| 5,937,034 | * | 8/1999 | Kennedy et al. ....................... 379/32 |
| 5,966,427 | * | 10/1999 | Shaffer et al. .......................... 379/1 |
| 6,041,295 | * | 3/2000 | Hinderks ............................. 704/206 |

* cited by examiner

*Primary Examiner*—Duc Nguyen
*Assistant Examiner*—Barry W Taylor
(74) *Attorney, Agent, or Firm*—Allen, Dyer Doppelt Milbrath & Gilchrist, P.A.

(57) ABSTRACT

A digital signal processor-based test set is configured and programmed to enable a craftsperson to monitor, receive and process signals of a variety of formats that may be present on a line under test, including user feature analog modem signals. Such user feature signals may include caller-identification signals, visual message waiting indicator signals, and analog display services interface signals. The test set employs a signal processing routine that operates in two modes: 1- terminal mode—in which the test set functions in the place of customer premises equipment (CPE); and 2- line monitor mode—in which the test set is connected to the line under test and monitors data signals being transmitted to and received from an existing CPE. In both modes the test set has the ability to not only display the data being sent to and from the CPE, but also parametric information about the data.

8 Claims, 6 Drawing Sheets

DIGITAL SIGNAL PROCESSOR-BASED TELEPHONE TEST SET ANALYZING AND DISPLAYED MULTIPLE SIGNAL PARAMETER DATA FOR TERMINAL MODE AND LINE MONITOR MODE OPERATION

CROSS REFERENCE TO RELATED APPLICATION

The present application is a continuation-in-part of copending U.S. patent application Ser. No. 08/885,372, filed Jun. 30, 1997, entitled: "Digital Signal Processor-Based Telephone Test Set," by R. B. Walance, assigned to the assignee and the disclosure of which is incorporated herein.

FIELD OF THE INVENTION

The present invention relates in general to communication systems, and is particularly directed to a new and improved digital signal processor-based craftsperson's test set, that operates in two modes: 1- terminal mode—in which the test set functions in the place of customer premises equipment (CPE); and 2- line monitor mode—in which the test set is connected to the line under test and monitors data signals being transmitted to and received from an existing CPE. In both modes the test set has the ability to not only analyze and display the data being sent to and from the CPE, but also parametric information about the signals being sent.

BACKGROUND OF THE INVENTION

For testing and troubleshooting purposes, telephone network field service personnel, or craftspersons, have conventionally employed what are essentially ruggedized versions of a standard telephone handset. As such, the functional capabilities of these conventional test sets are not adequate to handle an ever expanding number of aspects of today's telecommunication environment, including, but not limited to, special features, such as call-waiting, caller ID, and the use of POTS (plain old telephone service) lines to deliver digital data services. In addition, because the acoustic interface of a conventional test set is essentially a half-duplex architecture, the field technician's ability to use it in a 'hands-free' manner can be severely limited, especially in an environment having high ambient noise, such as that inherent in the operation of industrial equipment and the flow of highway traffic.

As a consequence, there is a need for an improved test set, which retains the capabilities and physical characteristics of a conventional test set (namely, one that can test POTS lines, and is relatively compact (hand held) and physically and electrically robust), yet enables the craftsperson to monitor, receive and process signals of a variety of formats that may be present on a line under test. Moreover, field personnel have expressed a desire that their test sets have a truly 'hands-free', full-duplex, dual direction acoustic interface or speakerphone, namely, one that allows the field technician to talk (from a distance) in the presence of background noise, while simultaneously listening to an acoustic output being generated by the test set's receiver.

SUMMARY OF THE INVENTION

In accordance with the present invention, the above-described objectives are achieved by a new and improved digital signal processor-based test set, that is configured and programmable to perform a variety of signal processing functions, including, but not limited to, performing conventional test set operations, providing effectively real-time, full-duplex speakerphone communications, and the processing of user feature analog modem signals. Such user feature signals may include caller-identification signals, visual message waiting indicator signals, and analog display services interface signals. The digital signal processor (DSP)-based test set of the present invention also has the ability to measure electrical conditions (on-hook and off-hook voltage, and off-hook current) of a telephone line. It can measure the line's response to an electrical stimulus, so as to enable the test set to detect the presence of an electrical discontinuity, such as a load coil, that has been inserted in the line.

The signal processing architecture of the digital signal processor-based test set of the present invention preferably includes a telecommunication link connection port, through which the test set may be connected to (tip and ring conductors) of a standard two-wire pair POTS subscriber line. A tip/ring interface, which serves as a POTS loop current load, couples audio (voice, ringing, tone) signals to and from the POTS line connection, and allows loop power to be derived from the POTS line for an internal loop-powered supply for operating the circuitry of the test set.

Incoming voice and tone signals from the POTS line are digitized by a line-associated codec and coupled to a supervisory control digital signal processor (DSP), which is programmed to process signals received from the line and which have been digitally formatted by the line codec for delivery to a user interface (input/output unit). The DSP is also operative to process inputs from the user interface unit for application to the line. Outgoing signals to be transmitted over the network, as supplied from the DSP, are converted into analog format by the line codec and applied to line via the tip/ring interface.

A monitor mode circuit is coupled to the line connection port to enable the line to be monitored for the presence of audio signalling without having to go off-hook. A data detector is coupled to the line connection port to determine whether data signals are present on the line, and thereby prevent the test set from going off-hook and corrupting a data signal, if in fact a data signal detected on the line.

The user interface unit allows the craftsperson to input and receive information signals associated with the operation of the test set, or to input and receive voice signals during full-duplex communications with another party coupled to the line. For this purpose, the user interface includes a keypad, an LCD visual display, and an audio interface through which the craftsperson may listen to and vocalize acoustic signals into the test set. The audio interface is coupled to the processor by means of an audio-associated codec.

In order to provide effectively real time, full-duplex, dual-direction communications, which allow the field technician to talk (from a location within the sensitivity range of the test set), while simultaneously listening to an acoustic output generated by the test set's receiver, the test set's processor is programmed to execute an echo canceling routine that suppresses a replica or echo of the acoustic signal that has been sourced from the far end of the line and has reentered the test set's microphone from its output speaker, or is coupled into the line as a result of impedance mismatches in the electrical interfaces.

To accommodate signals simultaneously sourced from each end of the network, the echo cancellation routine contains a pair of 'mirrored' or complementary echo cancellation software modules. A line (network) echo cancellation module processes signals in the signal paths with the line interface and is operative to prevent 'near end' audio signals input from the test set microphone from being injected as electrical echoes into the audio signals output from the speaker. An acoustic echo cancellation module processes signals in the signal paths of the test set's microphone and speaker and is operative to prevent 'far end' audio signals from the network from being injected as acoustic feedback echoes into the audio signals outbound to the network.

The full-duplex speakerphone processing routine is initialized in a half-duplex mode, allowing audio signals to be transmitted in only one direction at the time. Whichever audio signal has the higher signal level will control the signal path to be suppressed. During this initial half-duplex conversation between the craftsperson and the far end of the network, each of the echo cancellation modules trains an associated echo model. As the line and acoustic echo models are trained, the amount of gain reduction of the originally gain-suppressed signal path will be decreased, until the processing routine eventually reaches what is effectively a full-duplex mode of operation. The echo models are continuously adjusted during further audio signal processing. Should the performance of the echo canceler degrade below a threshold that effectively prevents simultaneous audio communications, the routine reverts back to half-duplex mode, in which gain of a respective signal path is controlled by audio level, as in initialization mode. Then, as the echo models are retrained, the processing routine again reaches full-duplex mode.

In addition to providing real time, full duplex voice communications, the test set of the present invention is operative to process user feature analog modem signals, including caller-identification (Caller ID and caller ID call waiting (CIDCW)) signals, visual message waiting indicator (VMWI) signals, and analog display services interface (ADSI) signals, each of which is customarily transported using standard 1200 bits per second (BPS) modem-based signalling (Bell 202 standard).

For caller ID processing, the test set is ON-HOOK. When a ringing signal is received from the central office, the test set's processor is operative to extract and demodulate the caller ID information that is transmitted in the quiescent interval between the first and second ringing tone bursts. This caller ID information is then displayed to the craftsperson via the LCD display of the test set's user interface.

For ADSI signal processing, the technician places a DTMF call to a ADSI server. When ADSI signals from the server are received in response to a request from the test set containing the feature access code (via DTMF signalling), a customer premises equipment (CPE) altering signal (CAS) will be received from the accessed server, advising the test set of an incoming caller information modem signal. The test set's DSP then sends a DTMF acknowledgement sequence back to the ADSI server. The audio to the test set's earpiece and speaker is muted, so that the subsequent incoming modem burst from the ADSI server will not be heard by the craftsperson. Once the ADSI information has been transmitted to and received by the test set, the test set's DSP sends a DTMF acknowledgement sequence back to the ADSI server, acknowledging the ADSI information received. The ADSI information is then demodulated for display to the craftsperson via the LCD display of the test set's user interface, and muting of the audio output to the earpiece and speaker is terminated. VMWI signal processing is similar to call waiting, caller ID, except that voice message data is transmitted without any type of trigger signal (e.g., ringing).

For caller ID/call waiting, in response to receiving a CAS signal from the central office, the test set's DSP sends a DTMF acknowledgement sequence back to the central office, as in the case of ADSI signals. It then mutes the audio output to the earpiece and speaker, to prevent the modem burst from being heard by the craftsperson. Then data transmitted to the test set is demodulated for display to the craftsperson via the LCD display of the test set's user interface, and muting of the audio output to the earpiece and speaker is removed.

The DSP-based test set of the present invention also has the ability to conduct additional line measurements, including measuring off-hook and on-hook line voltage and off-hook current conditions of a telephone line. In addition, it can measure the line's response to an electrical stimulus, so as to enable the test set to detect the presence of an electrical discontinuity, such as a load coil, inserted on the line. For load coil measurements, a swept frequency tone signal is applied to the line through a known impedance, and the resulting AC voltage across the tip and ring leads is measured. In particular, the variation in amplitude and phase of the AC voltage versus frequency is measured.

As will be described, the digital signal processor-based craftsperson's test set of the invention may operate in either of two modes in connection with caller ID, CIDCW, ADSI and VMWI. These two modes are terminal mode—in which the test set functions in the place of customer premises equipment, and line monitor mode—in which the test set is connected to the line under test and monitors/analyzes data signals being transmitted to and received from an existing CPE. In each mode the test set has the ability to not only analyze and display the data being sent to and from the CPE, but also parametric information about the transmitted signals themselves (such as but not limited to signal amplitude, frequency, timing, etc.).

DETAILED DESCRIPTION

Before describing in detail the digital signal processor-based telephone test of the present invention, it should be observed that the invention resides primarily in what is effectively a prescribed arrangement of conventional communication circuits and associated digital signal processing components, which are readily installed in a hand held test set housing, and an attendant supervisory control program therefor, that controls the operations of such circuits and components. Consequently, the configuration of such circuits and components, and the manner in which they are interfaced with other communication system equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustration and associated flow charts to be described are primarily intended to show the major components of the system in a convenient functional grouping and processing sequence, whereby the signal processing architecture of the inventive test set and its associated functionality may be more readily understood.

Figure 1:
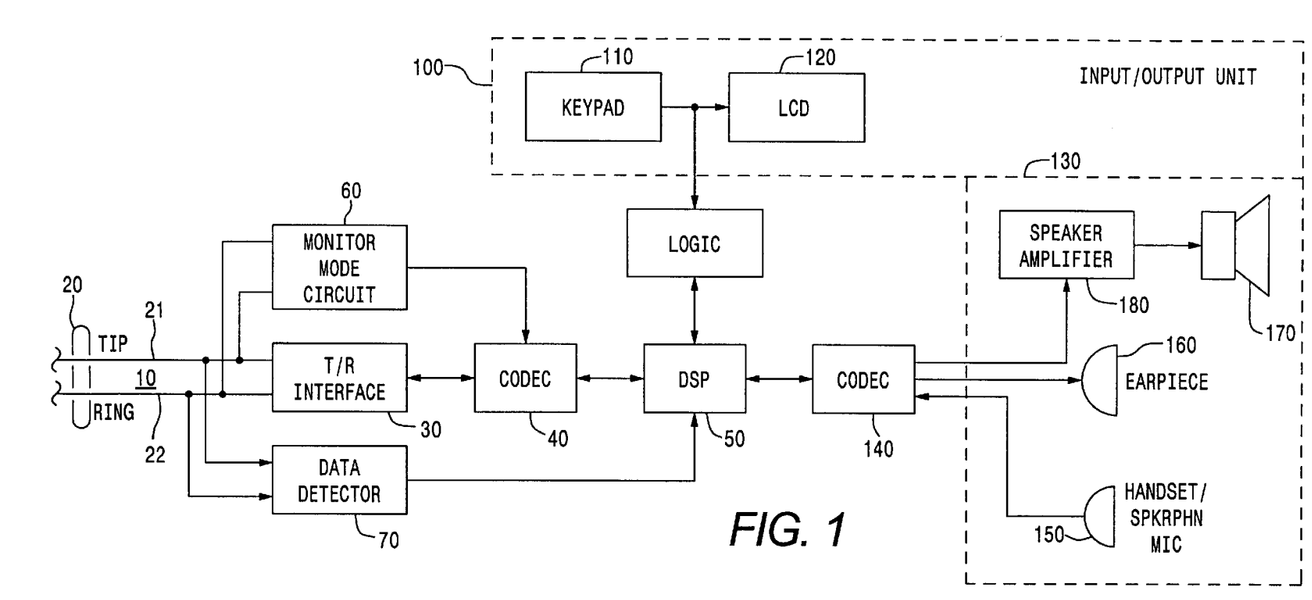
FIG. 1 diagrammatically illustrates the architecture of a digital signal processor-based test set of the present invention.

FIG. 1 diagrammatically illustrates the signal processing architecture of a digital signal processor (DSP)-based test set of the present invention as comprising a telecommunication link connection port 10, through which the test set is connectable with tip and ring conductors 21 and 22 of a standard two-wire pair POTS line 20. Coupled to port 10 is a standard tip/ring (T/R) interface 30, which serves as a POTS loop current load, and provides an audio (voice, ringing, tone) signal path to and from the POTS line connection at port 10. T/R interface 30 is also operative to derive loop power for a conventional internal loop-powered supply (not shown) for operating the circuitry of the test set.

Incoming signals received from the line by T/R interface 30 are digitized by a line-associated codec 40 and coupled to a digital signal processor (DSP) 50, which supervises and controls all operations of the test set. Outgoing signals to be transmitted over the network, as supplied in digital format from the digital signal processor 50 are converted into analog format by the codec 40 and applied to T/R interface 30. As a non-limiting example, DSP 50 may comprise a commercially available, relatively low cost, low power, and high performance DSP chip, such as one selected from the TMS320C chip set (e.g., TMS320C2xx or TMS320C5x type digital signal processor chips) manufactured by Texas Instruments, Inc. The availability of such high performance DSP components not only makes it possible for the processor to execute the signal processing functionality of each of a plurality of what have customarily been discrete communication components, but allows relatively sophisticated signal processing algorithms, such as bidirectional echo cancellation, to be described, to be executed in effectively real time and in parallel, thereby providing 'hands-free' full-duplex communication capability in a relatively compact device.

The digital signal processor 50 is programmed to process signals received from the line and digitally formatted by codec 40 for delivery to a user interface or input/output unit, shown in broken lines 100. The test set's DSP is also operative to process inputs from the user interface for application to the line. Additional standard digital processor operations include scanning the user interface's keypad 110, sending characters to an LCD visual display 120 for display, controlling the ON-HOOK/OFF-HOOK state of the T/R interface 30, and controlling the state of a speaker amplifier 180.

A high impedance monitor mode circuit 60 is (AC-) coupled to the tip/ring connection port 10 and has its output coupled to the processor 50 so as to enable the test set to monitor the line for the presence of audio signalling without having to go off-hook. A data detector circuit 70, which may be of the type described in the U.S. Patent to Benjamin et al, U.S. Pat. No. 4,939,765, is also coupled to the line connection port 10, and provides an output indicative of whether data signals are present on the line 20. This output is used to controllably prevent the test set from going off-hook and thereby corrupting a data signal, if in fact a data signal detected on the line.

The user interface 100 is the mechanism through which the craftsperson may input and receive information signals associated with the operation of the test set, or supply and receive voice signals in the course of full-duplex communications with another party coupled to the line. The user interface 100 includes the keypad 110 comprised of standard set of alpha-numeric and auxiliary function keys, LCD visual display 120, and an audio interface 130 through which the craftsperson may receive (listen to) and input (voice) acoustic signals relative to the test set.

The audio interface 130 is coupled to the digital signal processor 50 by means of an audio-associated codec 140. Similar to line-associated codec 40, audio-associated codec 140 is operative to digitize audio (voice) signals spoken into a test set microphone 150 for application to processor 50. Conversely, incoming signals received from the network (at line connection port 10), that have been digitized by codec 40 and processed by processor 50 are converted into analog format by codec 140, and applied to a test set earpiece (receiver) 160, and to a speaker 170 by way of a speaker amplifier 180.

As described above, the digital signal processor 50 is programmed to process signals that have been received from various inputs of the test set and digitally formatted by an associated codec. Once processed, the signals are appropriately formatted by a codec and forwarded to their intended output port. The manner in which these signals are processed and the supervisory control routine executed by the test set's supervisory digital signal processor for the various communication and control operations of the test set architecture described above are set forth below.

REAL TIME, FULL-DUPLEX SPEAKERPHONE COMMUNICATIONS

As described above, by full-duplex, dual-direction speakerphone is meant an acoustic signalling interface that allows the field technician to talk (from a nearby location within the sensitivity range of the test set), while also simultaneously (effectively in real time) listening to an acoustic output generated by the test set's receiver. This differs from conventional half-duplex speakerphone architectures, which are operative to allow only one-way audio transmission at any instant in time.

For this purpose, as described briefly above, the digital signal processor 50 employs an echo canceling routine that effectively suppresses the replica or echo of the acoustic signal that has been sourced from the far end of the line and reenters the test set's microphone from its output speaker, or is coupled into the line as a result of impedance mismatches in the electrical interfaces. Namely, the echo canceling routine executed by the test set's DSP is effective to remove the far end signal's echo from the near end signal path, so that only the near end signal (namely that locally sourced from the craftsperson) is transmitted back to the far end.

Figure 2:
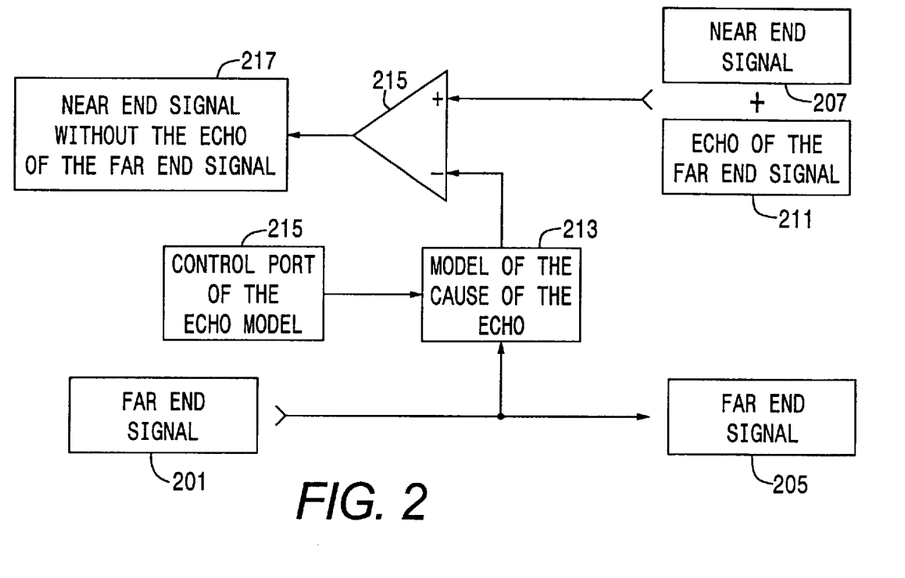
FIG. 2 diagrammatically illustrates an echo cancellation signal processing module.

The signal processing functionality of this echo cancellation signal processing routine is diagrammatically illustrated in FIG. 2, which shows three communication signals that are potentially present in the channel. The first signal is the far end signal, shown as being sourced at a far end 201 of the network, and which is reproduced (acoustically) at a near end output port 205 (e.g., via the test set's output speaker 170). The second signal is the near end signal 207, which is sourced locally (e.g., via the craftsperson speaking into the test set microphone 150). A third signal is the echo or replica 211 of the acoustic signal that has been sourced from the far end of the line and has reentered the test set's microphone from its output speaker, or is coupled into the line as a result of impedance mismatches in the electrical interfaces, as described above.

In addition to these actual signals that may be present at any time, the signal processing routine generates a fourth, echo cancellation control signal, which is a model 213 of the source of the echo signal 211. The echo signal model 213 is differentially combined in a differential operator 215 with the near end signal (that includes any echo 211 of the far end signal 201 that may be present) and the resultant signal 217—absent the unwanted echo signal component—is transmitted to the far end of the network.

When a far end signal 201 is present, but no near end signal 207 is present, any apparent near end signal is necessarily an echo and is to be suppressed. In this event, the echo signal model 213 is adjusted via a software-sourced control input 215, until the near end signal 207 is effectively zero. The length of time required to eliminate the echo signal 211 (here due to feeding back the far end signal as a near end signal) is typically referred to as convergence time.

Figure 3:
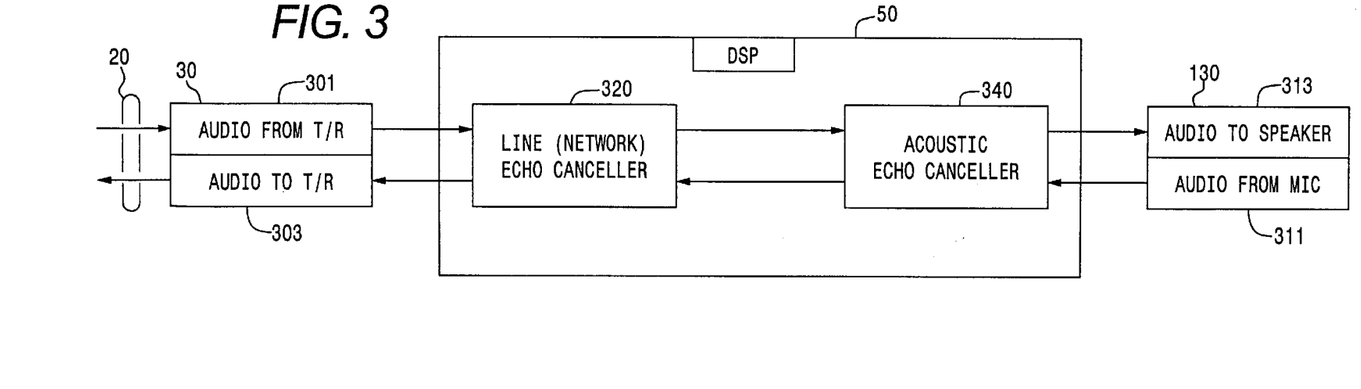
FIG. 3 diagrammatically illustrates a full-duplex echo cancellation signal processing routine employed by the digital signal processor of the test set of FIG. 1 for processing signals simultaneously sourced locally and from a far end of the network.

Since the speakerphone processing routine must accommodate signals simultaneously sourced from each end of the network, respective 'mirror' representations of the echo cancellation routine of FIG. 2 are combined into a full-duplex echo cancellation routine diagrammatically illustrated in FIG. 3. As shown therein, at the network or tip/ring (T/R) interface 30, there are audio signals 301 inbound from the network 20 and audio signals 303 outbound to the network. Complementarily, at the test set's acoustic interface 130, there are audio signals 311 input from the test set microphone 150 and audio signals 313 output from the speaker 170.

The processor is programmed to execute a line (network) echo cancellation signal processing routine 320, which processes signals in the signal paths with the T/R interface 30 and is operative to prevent 'near end' audio signals 311 input from the test set microphone 150 from being injected as electrical echoes into the audio signals 313 output from the speaker 170. The line (network) echo cancellation routine 320 may comprise a commercially available network echo cancellation processing software module, such as a "Low Complexity Network Echo Canceler," module by D2 Technologies, Inc., Santa Barbara, Calif., as a non-limiting example.

In the opposite direction, the processor executes an acoustic echo cancellation routine 340 which is operative to process signals in the signal paths microphone 150 and speaker 170 and to prevent 'far end', audio signals 301 input from the network 20 from being injected as acoustic feedback echoes into the audio signals 303 outbound to the network. Like the network echo cancellation routine 320, the acoustic echo cancellation routine 340 may comprise a commercially available acoustic echo cancellation software module, such as an "Acoustic Echo Cancellation, Hands Free (for TMS320C5x)" by France Telecom CNET, Marzin, France, or an "IDEC ™-II Acoustic Echo Cancellation, Hands Free for TMS320C3x/'C4x," module, by DSP Software Engineering, Inc., Bedford, Mass.

In operation, the combined, full-duplex speakerphone processing routine containing each of line and acoustic echo cancelers is initially in a half-duplex mode, allowing audio signals to be transmitted in only one direction at the time. For this purpose, the routine uses whichever audio signal has the higher signal level to dictate the path to be suppressed. If the transmit path has a higher audio level, then the gain of the receive path is reduced. Conversely, if the receive path has a higher audio level, then the gain of the transmit path is reduced.

During the initial half-duplex conversation between the craftsperson and the far end, each of the mirrored echo cancellation routines 320 and 340 will adaptively train or adjust its respective echo model. As the respective echo models are trained, the amount of gain reduction of the reduced signal path will be decreased, until the processing routine eventually reaches an effectively full-duplex mode of operation. The echo models are continuously adaptively adjusted during further audio signal processing. Should the performance of the echo canceler degrade below a prescribed threshold that effectively prevents simultaneous audio communications, the routine reverts back to half-duplex mode, in which gain of a respective signal path is controlled by audio level, as described above. Then, as the echo models are retrained, the processing routine again reaches full-duplex mode. This closed loop adjustment process is repeated, as necessary to maintain optimum performance.

CALLER-ID; CALLER-ID/CALL WAITING; ANALOG DISPLAY SERVICES INTERFACE (ADSI); VISUAL MESSAGE WAITING INDICATOR (VMWI)

As described briefly above, the digital signal processor-based test set of the present invention is operative to process user feature analog modem signals, including caller-identification (Caller ID) signals, caller ID/call waiting signals, visual message waiting indicator (VMWI) signals, and analog display services interface (ADSI) signals, each of which is customarily transported using a 1200 bits per second (BPS) modem-based signalling (Bell 202 standard). The communication control routine resident within DSP 50 is operative to demodulate this modem signal, and to detect a customer premises equipment (CPE) altering signal (CAS), which is used for caller ID/call waiting and ADSI signals, as a precursor signal indicating that modem data is being sent. The processor acknowledges a CAS signal by returning a prescribed DTMF sequence. The supervisory communication control routines executed by DSP 50 for each of these user feature analog modem signals will be described below with reference to the flow charts of FIGS. 4–6. As in the case of the echo cancellation routines, DSP 50 may employ commercially available communication processing software modules for processing user feature analog modem signals. As a non-limiting example, DSP 50 may employ the "ADSI" algorithm module available from D2 Technologies, which is operative to detect CAS tone signals, generate DTMF signals for acknowledgement and dialing, detect and decode 1200-baud FSK modem data signals, detect call-process tones in the presence of voice signals, and generate 1200-baud FSK modem signals for ADSI extended requirements.

The digital signal processor-based craftsperson's test set of the invention may operate in either of two modes in connection with caller ID, CIDCW, ADSI and VMWI. These two modes are terminal mode—in which the test set functions in the place of customer premises equipment, and line monitor mode—in which the test set is connected to the line under test, so that it's communications control processor monitor/analyze data signals being transmitted to and received from an existing CPE. In each mode the test set has the ability to not only analyze and display the data being sent to and from the CPE, but also parametric information about the transmitted signals themselves (such as but not limited to signal amplitude, frequency, timing, etc.).

Figure 4:
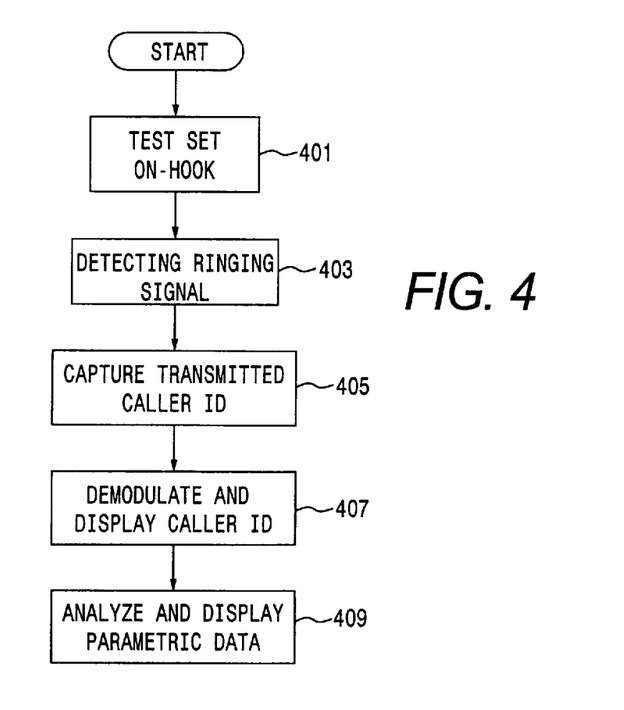
FIG. 4 shows a caller ID signal processing routine for terminal mode and line monitor modes.

CALLER ID SIGNAL PROCESSING IN TERMINAL AND LINE MONITOR MODES (FIG. 4)

Prior to the processing of an incoming call, the test set is in an ON-HOOK state, as shown at step 401. At step 403 a ringing signal is received from the central office, advising the test set of an incoming call. In step 405, the caller ID information which is transmitted in the (four second quiescent) interval between the first and second (one second on—four seconds off) ringing tone bursts. In step 407, the received caller ID information is demodulated and displayed to the craftsperson via the LCD display 120 of the test set's user interface 100. In addition, step 409 analyzes and displays caller ID parametric data, such as FSK signal amplitude, FSK frequency error, and the elapsed time from the termination of the first ring to the start of FSK data.

Figure 5:
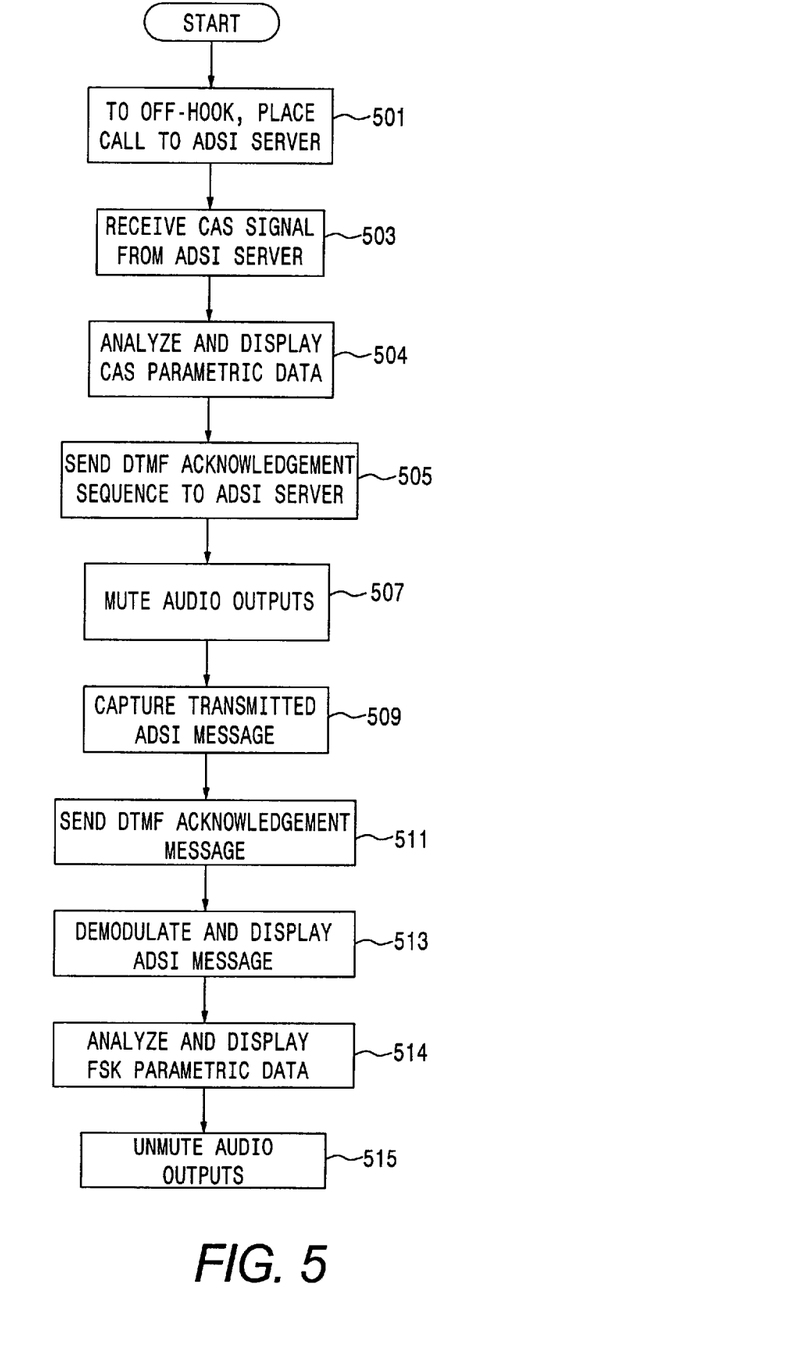
FIG. 5 shows an ADSI signal processing routine for terminal mode operation.

ADSI SIGNAL PROCESSING IN TERMINAL MODE (FIG. 5)

Since ADSI signals are received in response to a request from the test set, the test set will be in the OFF-HOOK state, as shown at step 501, placing a call containing the feature access code (via DTMF signalling) to the ADSI server. At step 503, a CAS signal is received from the accessed server, advising the test set of an incoming caller information modem signal. In step 504 ADSI parametric data is analyzed displayed. Such parametric data may include CAS signal amplitudes, CAS frequency errors, DTMF digits, DTMF signal amplitude, DTMF frequency errors, and elapsed time from SPCS CAS to CPE DTMF.

In step 505, DSP 50 sends a DTMF acknowledgement sequence back to the ADSI server. In step 507, the audio to the earpiece 160 and speaker amplifier 180 is muted, so that the subsequent modem burst from the ADSI server will not be heard by the craftsperson. Next, in step 509, the ADSI information is transmitted to the test set from the server. In step 511, the DSP 50 sends a DTMF acknowledgement sequence back to the ADSI server, acknowledging the ADSI information received in step 509. This information is then demodulated in step 513 for display to the craftsperson via the LCD display 120 of the test set's user interface 100. Like step 504, in step 514, ADSI parametric data is analyzed and displayed. ADSI parametric data may include FSK data, FSK signal amplitude, FSK frequency error, DTMF digits, DTMF signal amplitude, DTMF frequency errors, elapsed time from CPE DTMF to SPCS FSK, and elapsed time from SPCS FSK to CPE DTMF. In step 515, muting of the audio output to the earpiece 160 and the speaker amplifier 180 is removed, allowing the test set to return to its previous state.

Figure 8:
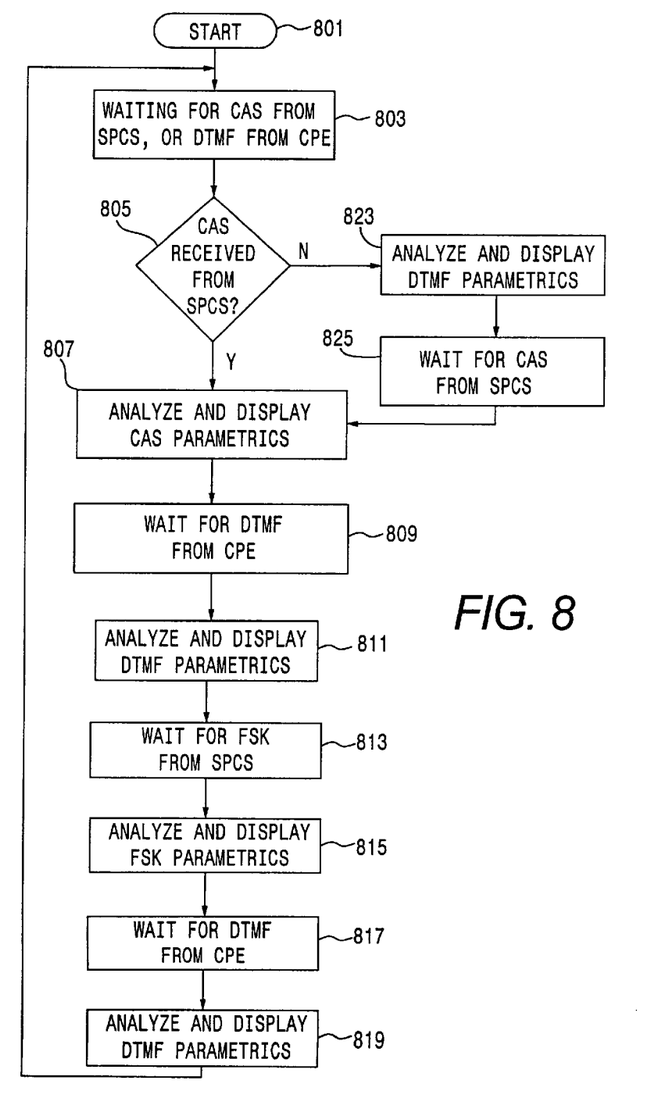
FIG. 8 shows an ADSI signal processing routine for line monitor mode operation.

ADSI SIGNAL PROCESSING IN LINE MONITOR MODE (FIG. 8)

In this mode, the test set will be ON-HOOK, and in a high impedance state, as shown at step 801. Normally, the first action taken in an ADSI session is that the CPE will be waiting for the CAS signal from the SPCS. The test set will therefore be waiting for this CAS signal or a DTMF signal from the CPE, as shown at step 803. At query step 805, a determination is made as to whether the CAS signal was received. If the answer to step 805 is YES (the CAS signal was received), then the routine transitions to step 807. If the answer to step 805 is NO (the CAS signal was not received), then the routine transitions to step 823.

For the case that the CAS signal is received, then in step 807, the signal is analyzed, CAS parametric data is displayed. The displayed CAS parametric data may include CAS signal amplitudes, CAS frequency errors, DTMF digits, DTMF signal amplitude, DTMF frequency errors, and elapsed time from SPCS CAS to CPE DTMF. Once the CAS signal has been received (from the SPCS to the CPE), then the CPE must acknowledge the CAS signal with DTMF signalling (back to the SPCS). In step 809, the test set is waiting for DTMF signals to be sent from the CPE to the SPCS. When these tones are received, they are analyzed and DTMF parametric data is displayed in step 811. In step 813, the test set is waiting for FSK signals to be sent from the SPCS. When these FSK signals are received, they are analyzed and FSK parametric data is displayed in step 815.

In step 817, the test set is waiting for DTMF acknowledgement signals to the FSK signals from the CPE. Once these DTMF acknowledgement tones are received, they are analyzed and displayed in step 819, and the process transitions back to step 803, to wait for another ADSI transaction. If the first action during wait step 803 is for the CPE to send information to the SPCS (by way of DTMF signalling), then the DTMF signaling is analyzed and associated parametric data is displayed at step 823. The routine then transitions to step 825, where the test set is again waiting for CAS signals from the SPCS. When such CAS signals are received, the routine returns to step 807.

Figure 6:
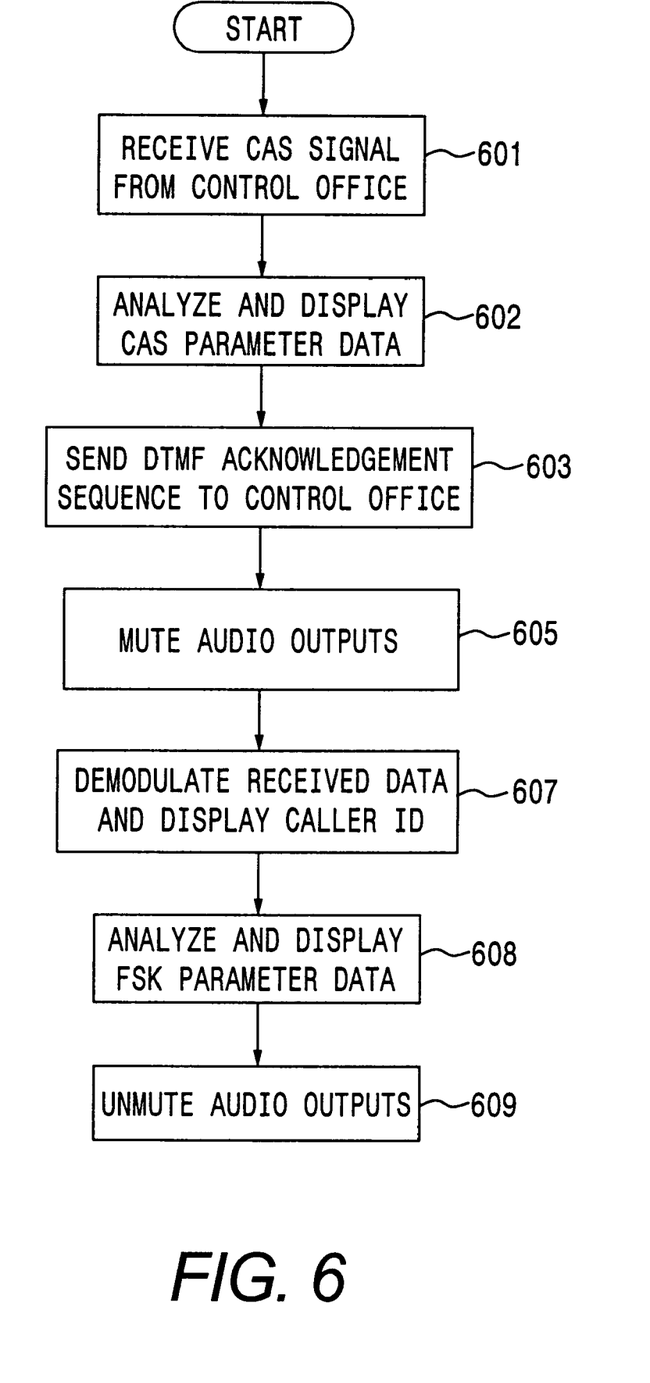
FIG. 6 shows a caller ID/call waiting processing routine for terminal mode operation.

CALLER ID/CALL WAITING PROCESSING IN TERMINAL MODE (FIG. 6)

For caller ID/call waiting, in an off-hook state (step 601), a CAS signal is received from the central office. In step 602, CAS parametric data is analyzed and displayed. In step 603, the test set's DSP sends back a DTMF acknowledgement sequence, as in the case of ADSI signals. In step 605, it mutes the audio output to the earpiece 160 and speaker amplifier 180, to prevent the modem burst from being heard by the craftsperson. Then data transmitted to the test set is demodulated (step 607) for display to the craftsperson via the LCD display 120 of the user interface 100. In step 608, FSK parametric data is analyzed and displayed. In step 609. muting of the audio output to the earpiece and speaker is terminated.

Figure 9:
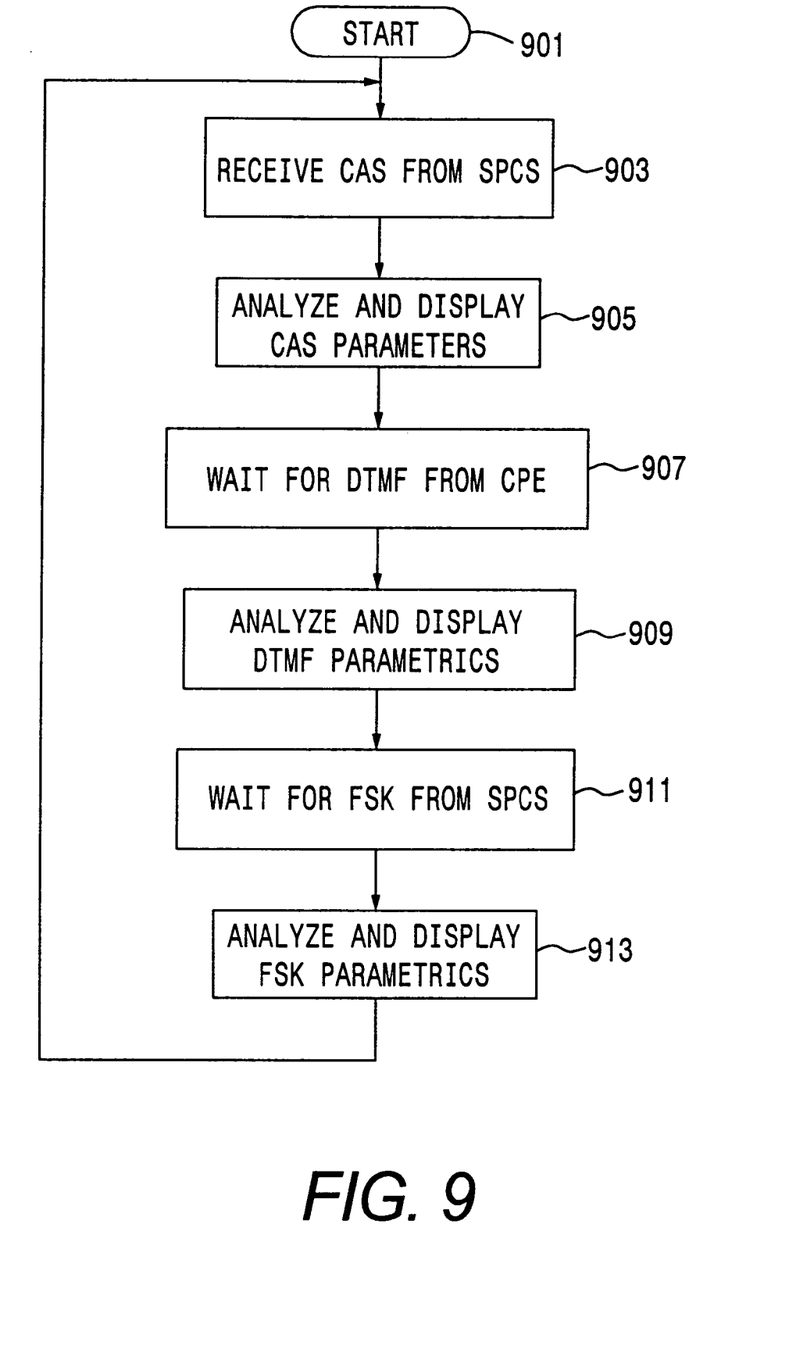
FIG. 9 shows a caller ID/call waiting processing routine for line monitor mode operation.

CALLER ID/CALL WAITING PROCESSING IN LINE MONITOR MODE (FIG. 9)

In this mode, the test set will be ON-HOOK, and in a high impedance state, as shown at step 901. The first action in CIDCW is that the CPE will receive a CAS signal from the SPCS, as shown at step 903. In step 905, the received CAS signal is analyzed, and CAS parametric data is displayed. The displayed CAS parametric data may include CAS signal amplitudes, CAS frequency errors, DTMF signal amplitudes, DTMF frequency errors, and elapsed time from SPCS CAS to CPE DTMF.

In step 907, the test set waits for the CAS acknowledgement signal (DTMF from the CPE back to the SPCS). In step 909, the DTMF signals are analyzed and their parametric data are displayed. After the SPCS receives the DTMF acknowledgement from the CPE, then FSK data from the SPCS will follow. At step 911, the test set waits for receipt of FSK signals, and then transitions to step 913, wherein the FSK signals are analyzed and FSK parametric data are displayed. The FSK parametric data may include elapsed time between CPE DTMF and SPCS FSK, FSK data, the amplitude of the FSK signal, FSK frequency error, DTMF signal amplitudes and DTMF errors. The routine then transitions back to step 903.

Figure 7:
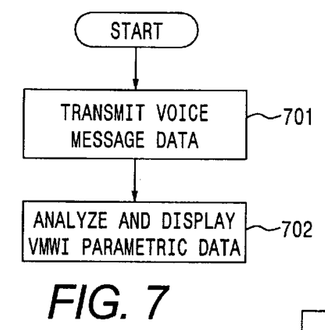
FIG. 7 shows a VMWI signal processing routine for terminal and line monitor modes.

VMWI SIGNAL PROCESSING FOR TERMINAL AND LINE MONITOR MODES (FIG. 7)

VMWI signal processing is similar to call waiting, caller ID, with voice message data being transmitted in step 701, except that there is no trigger signal prior to data transmission. In addition, in step 702, visual message waiting indicator parametric data (including FSK signal amplitude and FSK frequency error data) is analyzed and displayed.

LINE MEASUREMENTS

Because it is DSP-based, the test set of the present invention has the ability to conduct a number of auxiliary line measurements, including measuring off-hook and on-hook line voltage and off-hook current conditions, as well as third party signal analysis functions. For this purpose, standard filtering analysis mechanisms, such as Goertzel signal analysis algorithms may be used, with whatever parameter is being monitored being digitized and then coupled to processor memory for analysis.

For on-hook DC voltage measurements, the voltage (including polarity) across the T/R leads 20 is monitored. For off-hook measurements, both DC voltage (including polarity) and DC current through the T/R leads 20 are monitored. For on-hook/off-hook AC measurements, such as may be used for detecting the presence of a discontinuity, such as a load coil, a swept frequency tone signal is applied to the line through a known impedance, and the resulting AC voltage across the tip and ring leads is measured.

As will be appreciated from the foregoing description, the DSP-based test set of the present invention not only provides signal processing capabilities of a conventional test set, but its programmability enables it to monitor/analyze and display third party signalling traffic, such as caller ID, VMWI and ADSI, between a server and a customer's terminal. This provides the craftsperson with the ability to monitor, receive and process (analyze and display parametric information of) signals of a variety of formats that may be present on a line under test, including user feature analog modem signals. Such user feature signals may include caller-identification signals, visual message waiting indicator signals, and analog display services interface signals. Through embedded mirrored echo cancellation routines, the test set's supervisory DSP is able to provide what is effectively 'hands-free', full-duplex, dual direction acoustic speakerphone functionality, that allows the field technician to talk, while simultaneously listening to an acoustic output being generated by the test set's receiver.

In both the terminal mode, in which the test set functions in the place of customer premises equipment, and line monitor mode in which the test set is connected to the line under test and monitors data signals being transmitted to and received from an existing customer premises equipment, the test set has the ability to not only display the data being sent to and from the customer premises equipment, but also parametric information about the transmitted signals.

While I have shown and described an embodiment in accordance with the present invention, it is to be understood that the same is not limited thereto but is susceptible to numerous changes and modifications as are known to a person skilled in the art, and I therefore do not wish to be limited to the details shown and described herein, but intend to cover all such changes and modifications as are obvious to one of ordinary skill in the art.

What is claimed:

1. A craftsperson's test set for testing and conducting communications over telecommunication link comprising:

a telecommunication link connection port through which the test set is connectable with said telecommunication link;

a user interface through which said craftsperson may input and receive information signals associated with the operation of said test set, said user interface a manual input device, visual display, and an audio interface through which said craftsperson may input and receive acoustic signals; and a programmable digital signal processing unit, including signal format translation circuitry coupled with said telecommunication link connection port and said user interface, and containing a signal processing routine that is operative to controllably digitally process signals that have been received from said telecommunication link and have been digitally formatted by said signal format translation circuitry for delivery to said user interface, and to controllably digitally process signals that have been received from said user interface and have been digitally formatted by said signal format translation circuitry for application delivery to said telecommunication link connection port for application to said telecommunication link, and to display parametric information relating to either or both of said signals that have been received from said telecommunication link and have been digitally formatted by said signal format translation circuitry for delivery to said user interface, and signals that have been received from said user interface and have been digitally formatted by said signal format translation circuitry for application delivery to said telecommunication link connection port for application to said telecommunication link, wherein said signal processing routine contained in said programmable digital signal processing unit is operative to analyze and display parametric information of prescribed user feature analog modem signals received from said telecommunication port for presentation to said craftsperson by way of said user interface, and including an embedded echo cancellation routine for full-duplex, dual direction acoustic functionality.

2. A craftsperson's test set according to claim 1, wherein said prescribed user feature analog modem signals include at least one of caller-identification signals, visual message waiting indicator signals, and analog display services interface signals.

3. A craftsperson's test set according to claim 1, wherein said signal processing routine contained in said programmable digital signal processing unit is operative to analyze and display parametric data of signals in line monitor and terminal modes of operation of said test set.

4. A craftsperson's test set according to claim 1, wherein said analyzed and displayed parametric information includes at least one of FSK data, amplitude of an FSK signal, FSK frequency error, CAS signal amplitudes, CAS frequency errors, DTMF digits, DTMF signal amplitude, DTMF frequency errors, elapsed time from SPCS CAS to CPE DTMF, elapsed time from CPE DTMF to SPCS FSK, and elapsed time from SPCS FSK to CPE DTMF.

5. A signal processing routine for use with a craftsperson's test set for testing and conducting communications over telecommunication link, said test set including a telecommunication link connection pot through which the test set is connectable with said telecommunication link, a user interface through which said craftsperson may input and receive information signals associated with the operation of said test set, said user interface a manual input device, visual display, and an audio interface through which said craftsperson may input and receive acoustic signals, and a programmable digital signal processing unit, including signal format translation circuitry coupled with said telecommunication link connection port and said user interface, said signal processing routine being operative to execute the steps of:

(a) digitally processing at least one of signals that have been received from said telecommunication link and have been digitally formatted by said signal format translation circuitry for delivery to said user interface, and signals that have been received from said user interface and have been digitally formatted by said signal format translation circuitry for application delivery to said telecommunication link connection port for application to said telecommunication link, and (b) displaying parametric information relating to said at least one of said signals that have been received from said telecommunication signal and have been digitally formatted by said signal format translation circuitry for delivery to said user interface, and signals that have been received from said user interface and have been digitally formatted by said signal format translation circuitry for application delivery to said telecommunication link connection port for application to said telecommunication link, including prescribed user feature analog modem signals received from said telecommunication link by said telecommunication link connection port for presentation to said craftsperson by way of said user interface, and an embedded echo cancellation routine for full-duplex, dual direction acoustic functionality.

6. A signal processing routine according to claim 5, wherein said prescribed user feature analog modem signals include at least one of caller-identification signals, visual message waiting indicator signals, and analog display services interface signals.

7. A signal processing routine according to claim 5, which is operative to analyze and display parametric data of signals in line monitor and terminal modes of operation of said test set.

8. A signal processing routine according to claim 5, wherein said analyzed and displayed parametric information includes at least one of FSK data, amplitude of an FSK signal, FSK frequency error, CAS signal amplitudes, CAS frequency errors, DTMF digits, DTMF signal amplitude, DTMF frequency errors, elapsed time from SPCS CAS to CPE DTMF, elapsed time from CPE DTMF to SPCS FSK, and elapsed time from SPCS FSK to CPE DTMF.

* * * * *

UNITED STATES PATENT AND TRADEMARK OFFICE
CERTIFICATE OF CORRECTION

PATENT NO. : 6,215,854 B1
DATED : April 10, 2001
INVENTOR(S) : Robert B. Walance It is certified that error appears in the above-identified patent and that said Letters Patent is hereby corrected as shown below:

Title page,
Title, delete "Digital Signal Processor-Based Telephone Test Set Analyzing and Displayed Multiple Signal Parameter Data for Terminal Mode and Line Monitor Mode Operation". Insert -- Digital Signal Processor-Based Telephone Test Set Analyzing and Displaying Multiple Signal Parameter Data for Terminal Mode and Line Monitor Mode Operation --

Column 1,
Line 3, delete "Displayed" insert -- Displaying --

Signed and Sealed this

Eleventh Day of December, 2001

Attest:

NICHOLAS P. GODICI
Attesting Officer
Acting Director of the United States Patent and Trademark Office